United States Patent
Regan et al.

(10) Patent No.: US 6,359,418 B1
(45) Date of Patent: Mar. 19, 2002

(54) REPLACEABLE BATTERY MODULE

(75) Inventors: Rick Regan, Portland; Victoria J. Peters, Forest Grove; Wayne Perley, West Linn, all of OR (US)

(73) Assignee: Leupold & Stevens, Inc., Beaverton, OR (US)

( * ) Notice: Subject to any disclaimer, the term of this patent is extended or adjusted under 35 U.S.C. 154(b) by 0 days.

(21) Appl. No.: 09/596,600

(22) Filed: Jun. 19, 2000

Related U.S. Application Data
(60) Provisional application No. 60/140,291, filed on Jun. 18, 1999.

(51) Int. Cl.$^7$ ................................................ H02J 7/00
(52) U.S. Cl. ..................................................... 320/112
(58) Field of Search ........................... 42/103; 429/82, 429/94, 120; 320/112, 114, 132

(56) References Cited

U.S. PATENT DOCUMENTS

| | | | | |
|---|---|---|---|---|
| 3,924,117 A | * | 12/1975 | Brindley | 362/191 |
| 4,063,111 A | * | 12/1977 | Dobler et al. | 307/116 |
| 4,203,280 A | * | 5/1980 | Ziegler et al. | 368/187 |
| 4,244,040 A | * | 1/1981 | Fondiller et al. | 368/69 |
| 4,322,833 A | * | 3/1982 | Husted | 368/69 |
| 5,038,093 A | | 8/1991 | Edwards et al. | 320/106 |
| 5,200,687 A | * | 4/1993 | Lindblom et al. | 320/112 |
| 5,208,525 A | * | 5/1993 | Lopic et al. | 320/112 |
| 5,223,780 A | * | 6/1993 | Hu | 320/112 |
| 5,225,760 A | * | 7/1993 | Leiserson | 320/112 |
| 5,242,763 A | | 9/1993 | Konishi et al. | 429/27 |
| 5,260,638 A | * | 11/1993 | Hirahara | 429/90 |
| 5,602,456 A | * | 2/1997 | Cargin, Jr. et al. | 320/112 |
| 5,629,105 A | | 5/1997 | Matthews | 429/97 |
| 5,661,392 A | * | 8/1997 | Imazaeki | 320/106 |
| 5,764,029 A | * | 6/1998 | Coyle | 320/112 |
| 5,769,657 A | * | 6/1998 | Kondo et al. | 439/500 |
| 5,818,198 A | | 10/1998 | Mito et al. | 320/112 |
| 5,842,300 A | * | 12/1998 | Cheshelski et al. | 42/103 |
| 5,903,132 A | * | 5/1999 | Ohira et al. | 320/107 |
| 5,909,102 A | * | 6/1999 | Stone, III et al. | 320/114 |
| 5,974,303 A | * | 10/1999 | Krause | 455/90 |
| 5,977,746 A | | 11/1999 | Hershberger et al. | 320/112 |
| 6,001,504 A | * | 12/1999 | Batson et al. | 429/163 |
| 6,002,236 A | * | 12/1999 | Trant et al. | 320/114 |
| 6,010,317 A | * | 1/2000 | Maet et al. | 417/379 |
| 6,014,009 A | * | 1/2000 | Wierzbicki et al. | 320/107 |

* cited by examiner

*Primary Examiner*—Peter S. Wong
*Assistant Examiner*—Pia Tibbits
(74) *Attorney, Agent, or Firm*—Stoel Rives LLP

(57) ABSTRACT

A replaceable battery module for a battery-powered device includes a protective conductive canister sized to receive an electric storage battery. A conductive contact extends through an aperture of the canister for contacting a first terminal of the battery. A second terminal of the battery is electrically contacted by the canister. A preferred configuration of the canister and contact allow both of the terminals of the battery to be accessed from one end of the battery module. A seal is positioned between the canister and the contact for electrically insulating them and for sealing the aperture to prevent leakage of the battery beyond the battery module. A socket for electrically contacting the battery module is formed by a power input terminal assembly mounted within a battery-receiving cavity of a battery-powered device. The power input terminal includes a positive input terminal and a negative input terminal positioned to contact the respective conductive contact and canister of the battery module when the battery module is installed in the battery-powered device and urged toward the input terminals.

24 Claims, 3 Drawing Sheets

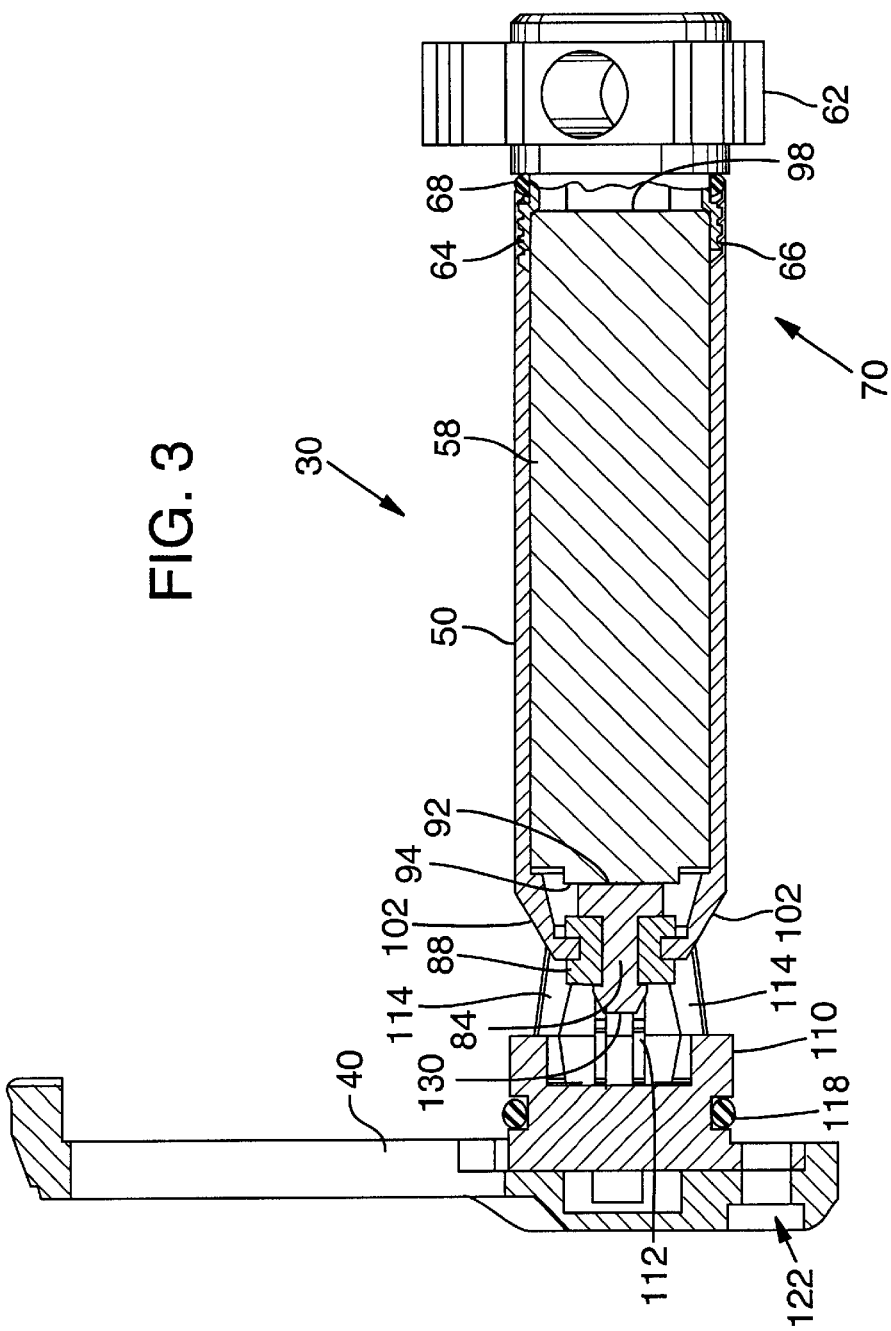
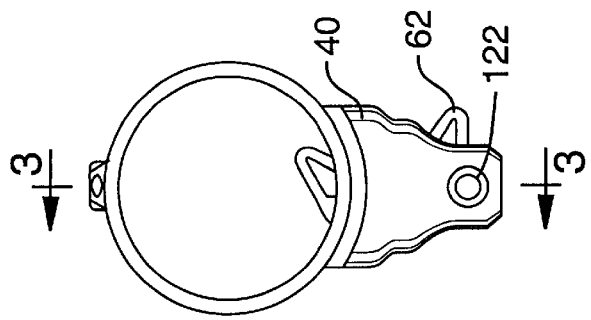

REPLACEABLE BATTERY MODULE

RELATED APPLICATION INFORMATION

This application claims priority from U.S. Provisional Patent Application No. 60/140,291, filed Jun. 18, 1999, which is incorporated herein by reference.

TECHNICAL FIELD

The present invention relates to leak-resistant battery modules for battery-powered devices and, more particularly, to a field-replaceable battery module for an battery-powered rifle accessory such as a telescopic scope of the type including an electrically-powered illuminated reticle.

BACKGROUND OF THE INVENTION

Battery-powered aiming devices such as rifle scopes, range finders, and night-vision equipment, for example, are designed to be mounted to a firearm for use by a shooter. Modern versions of these devices often include a battery compartment for receiving an electric storage battery (such as an AA- or AAA-size battery) that supplies power to an electronic component of the device. Typical battery compartments include two or more electrical contacts positioned so that they contact respective positive and negative terminals of the battery. One of the electrical contacts is typically spring biased or resilient so that the contacts press against and form an electrical connection with the battery terminals. However, the spring force and resiliency of such contacts is often insufficient to prevent interruption of the supply of power from the battery to the device when exposed to recoil forces of the firearm.

Battery compartments of some battery-powered devices include a conductive housing that completes a circuit between the battery terminals. A conductive housing of this type can corrode as a result of an electrolytic reaction induced by prolonged exposure to battery voltage. If the conductive housing is integral with the battery-powered device, then corrosion can cause serious damage to the device. This is of special concern with aiming devices, which house delicate optical and electronic components. Batteries can also rupture or leak, spilling corrosive chemicals onto the battery compartment and other parts of the device, which can result in similar damage.

Thus, there exists a need for an improved method and apparatus for using electric storage batteries with battery-powered aiming devices and other battery-powered devices generally.

SUMMARY OF THE INVENTION

In accordance with the present invention, a replaceable battery module is provided for use with a battery-powered device. The battery module includes a canister sized to receive an electric storage battery, such as a commercially available lead-acid, alkaline, nickel-cadmium, lithium, or other rechargeable or non-rechargeable battery. An aperture is formed in the canister in a position such that a first one of the battery's terminals is positioned proximal of the aperture when the battery is installed in the canister. The battery module further includes a conductive contact positioned to extend through the aperture and including a battery-contacting end for contacting the first battery terminal. A seal is positioned between the canister and the contact for sealing the aperture.

Many commercially available batteries, such as AA-size, AAA-size, N-size, and ⅓N-size batteries, are cylindrical in shape, having a positive terminal at one end and a negative terminal at the other end. However, other batteries, such as 9-volt transistor batteries, for example, are non-cylindrical and have terminals that are both located at a single end of the battery. The present invention may be used with any electric storage battery, but is particularly useful with cylindrically shaped batteries having positive and negative terminals at opposite ends. Accordingly, the canister may be conductive and adapted to be placed in electrical communication with a second one of the battery terminals when the battery is installed in the canister. The canister thereby provides a conductive path that allows both the positive and negative battery terminals to be accessed at one end of the battery module. This arrangement prevents electrolytic corrosion of the battery-powered device as has been problematic in prior art battery-powered devices, in which a housing of the device provides the conductive path. Alternatively, a second conductive contact may be provided for contacting the second one of the battery terminals, in which event it is unnecessary for the canister to be conductive.

To prevent corrosion caused by accidental battery leakage, the canister, the conductive contact (or contacts), and the seal preferably form a sealed chamber that fully encloses the battery. The sealed chamber may have a liquid impermeable seal, a gas-tight seal, a hermetic seal (both liquid and gas-tight), or a solids impermeable seal. To relieve pressure caused by outgassing of the battery, the battery module may include a pressure release valve. To facilitate battery installation and replacement, the canister may include a body portion having a receiving opening sized to receive the battery and a resealable cap portion sized to cover and seal the receiving opening. The aperture may be formed in one of the body and cap portions.

The battery module is adapted for use with a battery-powered device such as a firearm aiming device that includes a housing having a battery-receiving cavity and a power input terminal assembly mounted to the housing within the battery-receiving cavity. The power input terminal includes a positive input terminal and a negative input terminal positioned to contact the respective conductive contact and canister of the battery module when the battery module is installed in the battery-powered device. One of the positive and negative input terminals preferably includes a resilient member or spring. A latching mechanism secures the battery module in the battery-receiving cavity and urges the battery module toward the power input terminal assembly to ensure that the supply of electric power from the battery to the power input terminals will not be interrupted during recoil of the firearm. The latching mechanism may comprise part of the battery-powered device, or may be formed in the cap portion of the canister.

In prior art battery compartments, flexible power input terminals can allow the battery to carom within the battery compartment, which may damage the battery, causing it to rupture and leak. In a preferred embodiment of the invention, the battery contacting end of the conductive contact extends into the interior of the canister and presses against the first battery terminal to secure the battery within the battery module. This arrangement restrains movement of the battery during recoil of the firearm and prevents damage to the battery. The seal may be sufficiently resilient to absorb all or part of the shock of recoil that would otherwise transfer to the battery and thereby provide further protection from damage induced by recoil.

In an alternative embodiment, the battery contacting end of the conductive contact extends into the interior of the canister so that the battery contacting end is positioned to form a gap between the battery contacting end and first battery terminal when the battery module is removed from the battery-powered device. The seal is preferably sufficiently resilient so that when the battery module is installed in the battery-powered device, part of the power input terminal assembly depresses the contact so that it presses against the first terminal of the battery. This feature prevents accidental battery discharge of the battery when the battery module is carried or stored outside of the battery-powered device. It also restrains movement of the battery within the canister during recoil of the firearm.

An additional advantage of the invention is it's low cost of manufacture. Low manufacturing costs make it economical for the user to carry spare battery modules with batteries pre-installed.

Additional objects and advantages of this invention will be apparent from the following detailed description of preferred embodiments thereof which proceeds with reference to the accompanying drawings.

BRIEF DESCRIPTION OF THE DRAWINGS

FIG. 2 is an eyepiece end view of the power input terminal assembly and conduit ring of FIG. 1 shown removed from the rifle scope;

FIG. 3 is an enlarged cross sectional view of the power input terminal assembly and conduit ring taken along line 3—3 of FIG. 2 and coupled to a battery module in accordance with a first preferred embodiment of the present invention;

DETAILED DESCRIPTION OF THE PREFERRED EMBODIMENTS

Figure 1:
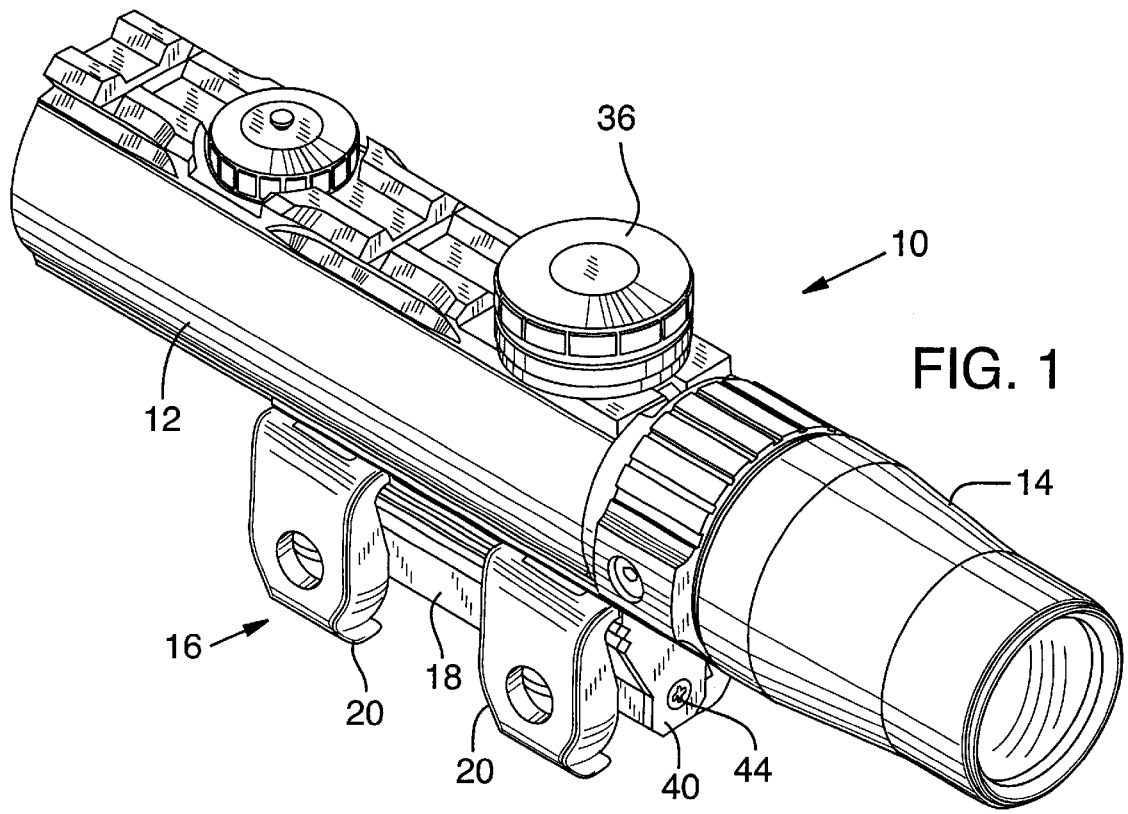
FIG. 1 is a perspective view of a rifle scope including a power input terminal assembly and conduit ring for use with a battery module in accordance with the present invention.

FIG. 1 is a perspective view of a rifle scope 10 implementing a first preferred embodiment of the present invention. With reference to FIG. 1, rifle scope 10 includes a primary housing 12, an eyepiece module 14, and a mount 16. Mount 16 includes a mounting bar 18 formed integrally with primary housing 12 and two pairs of adjustable mounting clamps 20 that attach to mounting bar 18 for securing rifle scope 10 to a firearm (not shown). Mounting bar 18 houses a battery module 30 (FIGS. 34) and a power input terminal assembly 34. A reticle control module 36 includes electronic circuitry for controlling the intensity of a battery-powered illuminated reticle (not shown) of rifle scope 10. A conduit ring 40 of power input terminal assembly 34 is mounted between primary housing 12 and eyepiece module 14 to provide an enclosed pathway for a flex circuit (not shown) that connects battery module 30 to reticle control module 36 for supplying battery power to the electronic circuitry of reticle control module 36. Conduit ring 40 is secured to mounting bar 18 by a screw 44.

Figure 4:
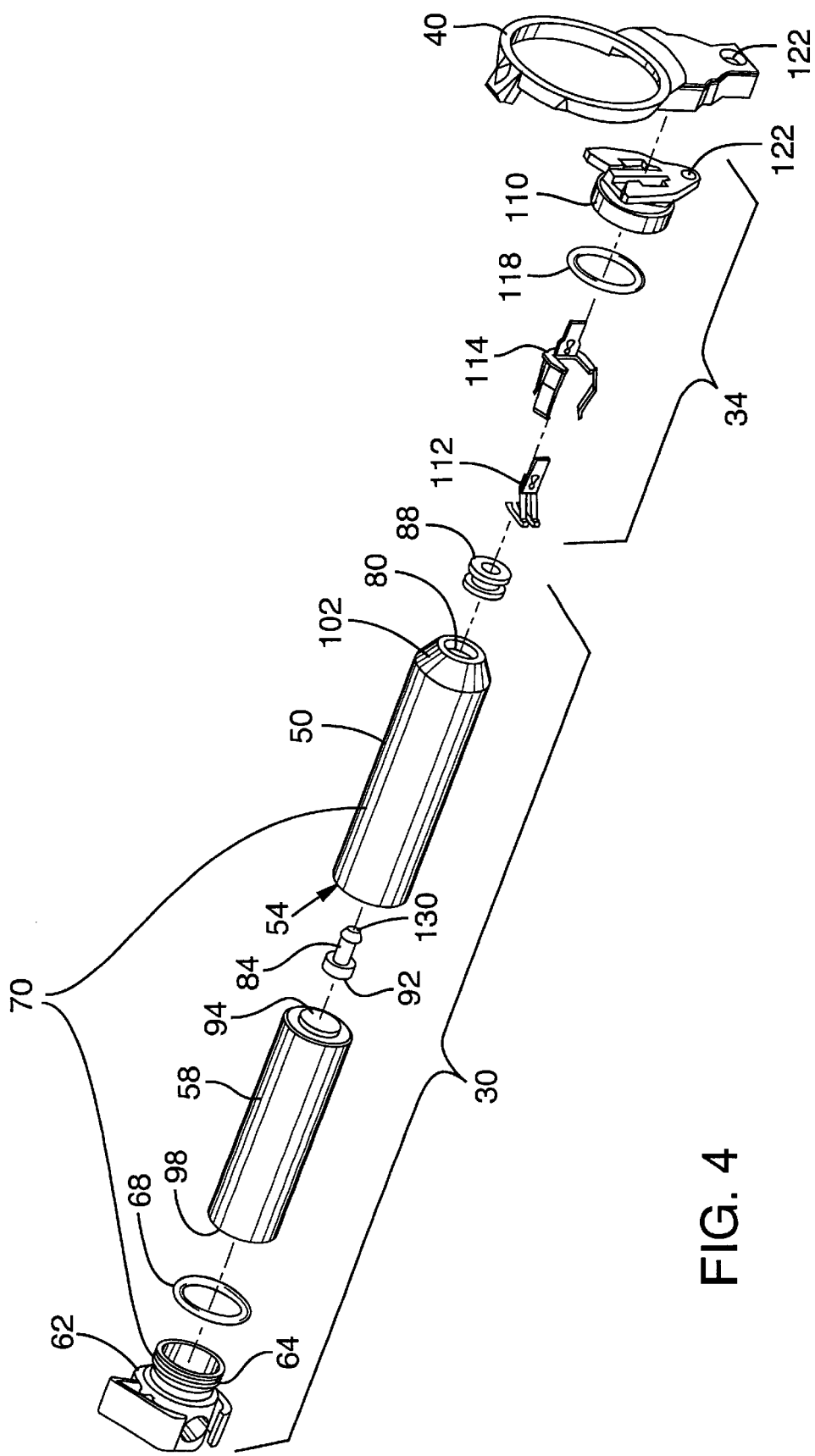
FIG. 4 is an exploded perspective view of the battery module, power input terminal assembly, and conduit ring of FIG. 3.

FIG. 2 is an eyepiece end view of power input terminal assembly 34, conduit ring 40 and battery module 30 (FIG. 3) of FIG. 1 with the remainder of rifle scope 10 omitted for clarity. FIG. 3 is an enlarged cross sectional view of battery module 30, power input terminal assembly 34, and conduit ring 40 taken along line 3—3 of FIG. 2. FIG. 4 is an exploded perspective view of battery module 30, power input terminal assembly 34, and conduit ring 40. With reference to FIGS. 2–4, battery module 30 includes an electrically conductive canister body 50 including a receiving opening 54 that is sized to receive a AA-size battery 58. A latching cap 62 includes external threads 64 that mate with internal threads 66 (FIG. 3) in canister body 50 to form a conductive pathway between latching cap 62 and canister body 50. A canister o-ring 68 is provided for sealing latching cap 62 against canister body 50 to form an enclosed canister 70. An aperture 80 formed in canister body 50 is sized to receive a conductive contact 84 that is sealed within aperture 80 by a seal 88. When battery 58 is installed in canister body 50, a battery-contacting end 92 of contact 84 presses against and makes electrical contact with a positive terminal 94 of battery 58. In addition, a negative terminal 98 of battery 58 makes electrical contact with latching cap 62 so that canister body 50 is in electrical communication with negative terminal 98. A frusto-conical contact region 102 of canister body 50 allows positive and negative terminals 94, 98 of battery 58 to be electrically accessible from one end of canister 70.

Power input terminal assembly 34 of rifle scope 10 includes a terminal holder 110 that is formed of an electrically insulating material that forms a mounting base for positive and negative power input terminals 112, 114. Positive and negative power input terminals 112, 114 are connected to a flex circuit or wiring (not shown) that is encased in conduit ring 40. A input terminal o-ring 118 is provided for sealing terminal holder 110 within a battery-receiving cavity (not shown) of rifle scope 10, which is sized to receive battery module 30. Positive and negative input terminals 112, 114 are preferably made of beryllium copper to provide spring force for electrically contacting and securing battery module 30 to prevent it from moving within the battery receiving cavity. A mounting hole 122 extends through conduit ring 40 and terminal holder 110 for receiving screw 44 to mount power input terminal assembly 34 within the battery receiving cavity. When battery module 30 is installed in the battery receiving cavity, latching cap 62 is then secured to housing 12 of rifle scope 10. For installation, the user slides battery module in the battery receiving cavity while holding latching cap 62, then presses battery module 30 against power input terminal assembly 34 and twists battery module 30 so that latching cap 62 seats in a transverse slot (not shown) in housing 12 of rifle scope 10. The pressure applied during installation causes positive input terminal 112 to press against a distal end 130 of contact 84; and causes negative input terminal 114 to press against contact region 102 of canister body 50.

Figure 5:
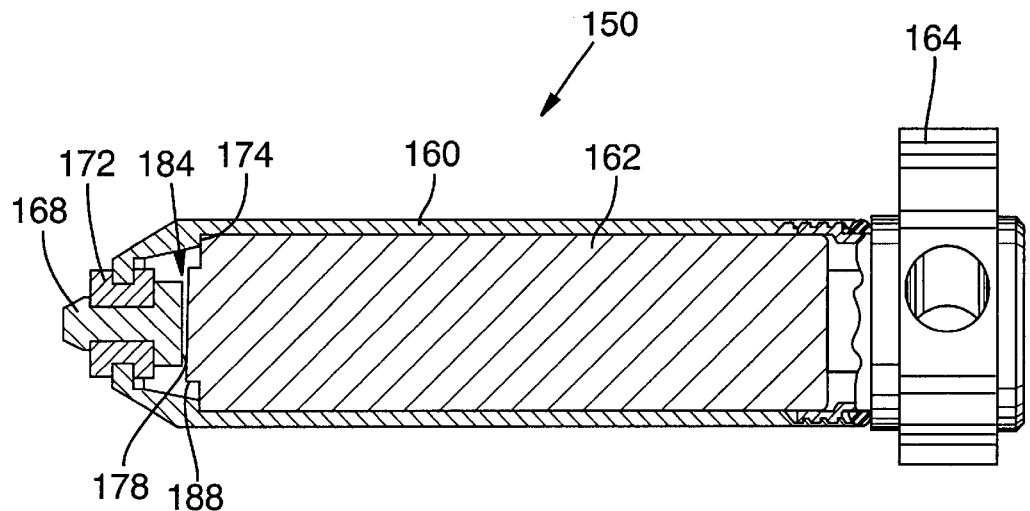
FIG. 5 is an enlarged cross sectional view of an alternative embodiment battery module, having a floating contact that depresses upon installation of the battery module in a battery-powered device.

FIG. 5 shows an enlarged cross sectional view of an alternative embodiment battery module 150 that includes a conductive canister body 160, AA-size battery 162, latching cap 164, conductive contact 168, and seal 172 that are assembled in a manner similar to battery module 30 of FIGS. 2–4. With reference to FIG. 5, canister body 160 is sized so that battery 162 fits securely against a shoulder 174 of canister body when latching cap 164 is screwed in place. A battery contacting end 178 of conductive contact 168 extends into canister body 160 so that battery contacting end 178 is positioned to form a gap 184 between battery contacting end 178 and the positive terminal 188 of battery 162 when battery module 150 is removed from the battery-powered device. Seal 172 is preferably formed of a resilient material such as rubber to allow conductive contact 168 to be depressed against positive terminal 188 when battery module 150 is installed in the battery-powered device.

It will be obvious to those having skill in the art that many changes may be made to the details of the above-described embodiments of this invention without departing from the underlying principles thereof. The scope of the present invention should, therefore, be determined only by the following claims.

What is claimed is:

1. A replaceable battery module for use with a battery-powered device, comprising:
   an electrically conductive canister including an aperture and having an interior adapted to receive an electric storage battery including a first terminal and a second terminal, the canister sized so that the second terminal is placed in electrical contact with the canister and the first terminal is positioned proximal of the aperture;
   an electrically conductive contact, having a battery contacting end and a distal end, the contact extending through the aperture so that the battery contacting end is spaced apart from the first terminal of the electric storage battery when the electric storage battery is installed in the canister; and
   a seal positioned in the aperture between the canister and the contact for electrically insulating the contact from the canister.

2. The battery module of claim 1 in which the seal is resilient so that the contact may be moved into electrical contact with the first terminal in response to applying pressure to the distal end of the contact and so that the spacing between the contact and the first terminal is restored when the pressure is removed.

3. The battery module of claim 2 in which the seal is sufficiently rigid to prevent accidental engagement of the contact with the first terminal.

4. The battery module of claim 1 in which the canister, the contact, and the seal form a sealed chamber that fully encloses the electric storage battery to prevent leakage from the sealed chamber in the event of leakage from the electric storage battery.

5. The battery module of claim 1 in which the canister includes a body portion having a receiving opening and a removable cap portion sized to cover and seal the receiving opening, the aperture being formed in one of the body portion and the cap portion, and the receiving opening sized to receive the electric storage battery for removably installing the electric storage battery in the canister.

6. The battery module of claim 1 in which:
   the interior of the conductive canister is sized to receive an elongate battery having first and second terminals located at opposite ends of the elongate battery; and
   the contact is positioned so that the first and second terminals of the battery are electrically accessible by making electrical contact with the contact and the canister, respectively, proximal to one end of the battery module.

7. The battery module of claim 1, further comprising a pressure release valve for relieving pressure from the interior of the canister.

8. The battery module of claim 1 in which:
   the battery powered device is an aiming device mounted to a firearm; and
   the seal is sufficiently resilient to absorb at least a portion of the energy of a recoil of the firearm to thereby prevent damage to the electric storage battery.

9. A replaceable battery module for use with a battery-powered device, comprising:
   a canister including an aperture and having an interior sized to receive an electric storage battery having a first terminal and a second terminal, the interior shaped to receive the electric storage battery in a position such that the first terminal is proximal of the aperture;
   a first conductive contact positioned to extend through the aperture and having a battery-contacting end spaced apart from the first terminal when the electric storage battery is enclosed in the canister; and
   a second conductive contact positioned for contacting the second terminal when the electric storage battery is enclosed in the canister;
   a seal positioned between the canister and the first contact for sealing the aperture, the seal being resilient so that the first contact may be engaged in electrical contact with the first terminal by applying inwardly-directed pressure to the first contact and so that the spacing between the contact and the first terminal is restored when the pressure is removed.

10. The battery module of claim 9 in which the seal is sufficiently rigid to prevent accidental engagement of the contact with the first terminal.

11. The battery module of claim 9 in which the canister, the first and second contacts, and the seal form a sealed chamber that fully encloses the electric storage battery to prevent leakage from the sealed chamber in the event of leakage from the electric storage battery.

12. The battery module of claim 9 in which the canister includes a body portion having a receiving opening and a removable cap portion sized to cover and seal the receiving opening, the aperture being formed in one of the body portion and the cap portion, and the receiving opening sized to receive the electric storage battery for removably installing the electric storage battery in the canister.

13. The battery module of claim 9 in which:
   the conductive canister is sized to fit an elongate battery having first and second terminals located at opposite ends of the elongate battery; and
   the contact is positioned so that the first and second terminals of the battery are electrically accessible by making electrical contact with the contact and the canister, respectively, proximal to one end of the battery module.

14. The battery module of claim 9, further comprising a pressure release valve for relieving pressure from the interior of the canister.

15. The battery module of claim 9 in which:
   the battery powered device is an aiming device mounted to a firearm; and
   the seal is sufficiently resilient to absorb at least a portion of the energy of a recoil of the firearm to thereby prevent damage to the electric storage battery.

16. A battery-powered device, comprising:
   (a) a housing including a battery-receiving cavity;
   (b) a power input terminal assembly mounted to the housing and positioned in the battery-receiving cavity, the power input terminal assembly including a positive input terminal and a negative input terminal;
   (c) a replaceable battery module sized to fit in the battery-receiving cavity, the battery module including:
      (i) a electrically conductive canister including an aperture and having an interior sized and shaped to enclose an electric storage battery having a first terminal and a second terminal so that the second terminal is placed in electrical contact with the canister and the first terminal is positioned proximal of the aperture, (ii) an electrically conductive contact extending through the aperture, the contact contacting one of the positive and negative input terminals of the power input assembly when the battery module is installed in the electrically-powered device, the other of the positive and negative input terminals contacting the canister when the battery module is installed in the electrically-powered device, and (iii) a seal positioned in the aperture between the canister and the contact for electrically insulating the contact from the canister; and (d) a latching mechanism for securing the battery module in the battery-receiving cavity.

17. The battery-powered device of claim 16 in which:

the electrically conductive contact of the battery module includes a battery contacting end and a distal end, the contact being sized to extend into the interior of the canister so that the battery contacting end is positioned to form a gap between the battery contacting end and the first terminal of the electric storage battery when the battery module is removed from the housing;

the latching mechanism urges the battery module toward the power input terminal assembly; and the seal of the battery module is sufficiently resilient so that the contact is moved into electrical contact with the first terminal of the electric storage battery when the battery module is urged against the power input terminal assembly.

18. The battery-powered device of claim 17 in which the seal of the battery module is sufficiently rigid to prevent accidental engagement of the contact with the first terminal when the battery module is removed from the battery-powered device.

19. The battery-powered device of claim 16 in which the canister, the contact, and the seal of the battery module form a sealed chamber that fully encloses the electric storage battery to prevent leakage from the sealed chamber in the event of leakage from the electric storage battery.

20. The battery-powered device of claim 16 in which the canister of the battery module includes a body portion having a receiving opening and a removable cap portion sized to cover and seal the receiving opening, the aperture being formed in one of the body portion and the cap portion, and the receiving opening sized to receive the electric storage battery for removably installing the electric storage battery in the canister.

21. The battery-powered device of claim 16 in which one of the positive and negative input contacts is resilient.

22. The battery-powered device of claim 16 in which one of the positive and negative input contacts includes a conductive spring.

23. The battery-powered device of claim 16 in which:

the conductive canister of the battery module is sized to receive an elongate battery having first and second terminals located at opposite ends of the elongate battery; and the contact is positioned so that the first and second terminals of the battery are electrically accessible by electrically contacting the contact and the canister, respectively, proximal to one end of the battery module.

24. The battery-powered device of claim 16 in which:

the battery powered device is an aiming device mounted to a firearm; and the seal of the battery module is sufficiently resilient to absorb at least a portion of the energy of a recoil of the firearm to thereby prevent damage to the electric storage battery.

* * * * *

UNITED STATES PATENT AND TRADEMARK OFFICE
CERTIFICATE OF CORRECTION

PATENT NO. : 6,359,418 B1
DATED : March 19, 2002
INVENTOR(S) : Rick Regan, Victoria J. Peters and Wayne Perley It is certified that error appears in the above-identified patent and that said Letters Patent is hereby corrected as shown below:

Column 3,
Line 53, "(FIGS. 34)" should read -- (FIGS. 3-4) --.

Column 5,
Line 34, "sufficiently rigid" should read -- rigid enough --.
Line 63, "sufficiently resilient" should read -- resilient enough --.

Column 6,
Line 22, "sufficiently rigid" should read -- rigid enough --.
Line 51, "sufficiently resilient" should read -- resilient enough --.

Column 7,
Line 33, "sufficiently rigid" should read -- rigid enough --.

Column 8,
Line 31, "sufficiently resilient" should read -- resilient enough --.

Signed and Sealed this

First Day of July, 2003

JAMES E. ROGAN
*Director of the United States Patent and Trademark Office*